United States Patent [19]
Hautau

[11] 3,895,424
[45] July 22, 1975

[54] MACHINE TOOL

[75] Inventor: Charles F. Hautau, Oxford, Ohio

[73] Assignee: Vulcan Tool Company, Dayton, Ohio

[22] Filed: July 26, 1972

[21] Appl. No.: 275,267

[52] U.S. Cl.................. 29/38 C; 29/563; 82/2.5; 408/44
[51] Int. Cl............................................ B23q 39/04
[58] Field of Search............. 29/38 C, 33 P, 563; 408/45, 71, 44, 46; 82/2 E; 74/824, 825

[56] References Cited
UNITED STATES PATENTS

| | | | |
|---|---|---|---|
| 1,422,140 | 7/1922 | Sears | 29/38 C |
| 2,837,935 | 6/1958 | Deliso | 29/38 C |
| 2,934,978 | 5/1960 | Estabrook | 74/824 X |
| 2,953,069 | 9/1960 | Smith | 29/38 C |
| 3,203,282 | 8/1965 | Wilson | 408/46 |
| 3,487,748 | 1/1970 | Grage | 408/59 X |
| 3,599,517 | 8/1971 | Muller | 82/2 E |
| 3,609,838 | 10/1971 | Wiest | 408/44 X |
| 3,733,142 | 5/1973 | Hoglund | 408/44 X |
| 3,740,806 | 6/1973 | Witzig et al. | 408/71 X |

Primary Examiner—J. M. Meister
Assistant Examiner—Z. R. Bilinsky
Attorney, Agent, or Firm—Jacox & Meckstroth

[57] ABSTRACT

A supply of unfinished workpieces are successively secured to corresponding support fixtures by threaded fasteners tightened by hydraulic motors, and each workpiece and its support fixture are automatically transferred by manipulator to a turret where the support fixture is rigidly clamped by a power driven lock screw to a peripheral seat on the turret. The turret is normally clamped by a hydraulic cylinder to a supporting frame and is released for indexing to present a portion of each workpiece successively to a series of machining stations disposed around the frame. The workpiece is then released from the turret, repositioned by the manipulator and reclamped to the turret which is again indexed for successively presenting another portion of the workpiece to each machining station. A drilling unit is located at one of the machining stations and includes a close-coupled hydraulic motor and rotary spindle unit which is supported for axial movement and provides for supplying a fluid coolant directly through a hollow shaft of the motor and the spindle to a drill supported by the spindle. A similar machining unit is located at another station to provide for tapping a hole within the workpiece, and includes a transmission disposed between the hydraulic motor and the spindle for driving a ball screw which feeds the unit axially at a speed correlated with the rotation of the tap. At a third machining station, a similar hydraulic motor and spindle unit supports a crossfacing head which provides for substantial radial movement of a set of cutting tools in response to movement of an actuating rod which extends axially through the hollow motor shaft and the spindle. At another machining station, a plurality of tubular drill support spindles are separately driven by hydraulic motors and are independently supported for simultaneous radial movement in addition to rotary indexing and precision axial movement as a unit. All of the operations of the machine tool are adapted to be numerically controlled and provide for precision high speed machining of each workpiece.

28 Claims, 16 Drawing Figures

MACHINE TOOL

BACKGROUND OF THE INVENTION

In the machining of relatively heavy workpieces, for example, the forged bodies of high pressure valves which are used in the oil well and chemical industries, usually each workpiece or valve body requires a series of different machining operations, such as the drilling or boring of the fluid passage through each valve body, the facing or machining of the connecting flanges on opposite ends of the valve body, and the drilling of a number of bolt connecting holes within each of the flanges. In place of the connecting flanges, some of the valve bodies are tapped within the ends of the fluid passage to provide for threaded connections with a pipe line.

To perform these various machining operations, the workpieces are usually conveyed or transported in batches on pallets to a series of machine tools where the corresponding operators perform the machining operations required on each of the workpieces. For example, in the machining of high pressure gate valves, a batch of the valves may be first transported to a drilling machine where an operator drills or bores the center fluid passage within each valve body. The valve bodies may then be transported to either a tapping machine where the ends of the fluid passage are threaded or to a lathe where each valve body is chucked, and each end flange of the valve body is faced. The valve bodies with end flanges are then transported to a multiple head drilling machine where the operator drills the desired number of holes in each of the end flanges. This method of performing multiple machining operations on each workpiece requires substantial time and labor not only for transporting the workpieces from one machine tool to the next, but also for positioning each workpiece relative to each machine tool, and for operating each of the machine tools.

SUMMARY OF THE INVENTION

The present invention is directed to an improved machine tool system and machine tool components which provide for efficiently performing multiple machining operations on a continuous supply of workpieces and which are especially desirable for producing precision machining of relatively heavy workpieces. The machine tool and tool units of the invention also significantly reduce the time and labor required for completely machining each workpiece and, in addition, significantly reduce the floor space required for performing multiple machining operations on a high volume production of workpieces. While the machine tool of the invention is illustrated in connection with the performing of multiple machining operations on the forged bodies of high pressure gate valves, it is to be understood that the machine tool of the invention and its various components may be used either collectively or separately for machining other types of workpieces, especially when the machining operation requires substantial torque or power, and precision machining is desired.

In accordance with the illustrated embodiment of the invention, a supply of relatively heavy workpieces in the form of unfinished forged valve bodies are successively mounted on corresponding individual fixture plates each carrying a plurality of fasteners which are power threaded into the workpiece for rigidly securing the workpiece to the fixture plate. Each workpiece and its corresponding fixture plate are then automatically transferred by a manipulator to a seat formed on the peripheral surface of a rotary indexing turret. The fixture plate is automatically clamped to the turret which is capable of carrying a plurality of peripherally spaced workpieces and corresponding fixture plates at any one time.

The turret is normally rigidly clamped to a base frame, but is released for rotary indexing to present each workpiece to a series of machine tool units which perform a corresponding series of machining operations on each of the workpieces. One of the machine tool units consists of a hollow spindle which is close-coupled with a splined hollow shaft hydraulic motor and provides for supplying a coolant axially through the center of the motor and the spindle to the shank of a cutting tool such as a drill. The spindle also provides a mechanism for conveniently ejecting the cutting tool, and the combined motor and spindle support housing are supported for positive and precision axial movement at preselected speeds for advancing and retracting the cutting tool.

Another one of the machine tool units consists of a cross-facing head which is rotatably supported by a spindle also driven by a close-coupled hollow shaft hydraulic motor. A set of cross-facing tool support members are supported for radial movement by the head and are precisely positioned by an actuating rod which extends through the hydraulic motor and the spindle to an actuating mechanism including a double faced rack and a set of transfer gears. The actuating rod is moved axially by a digitally controlled motor.

Another machine tool unit consists of a plurality of drill heads and corresponding drill support spindles which are individually driven by corresponding hydraulic motors and are supplied with a cooling fluid through a passage within each spindle. The spindles are laterally adjustable by a digitally controlled actuating mechanism, and the entire group of drill heads are movable as a unit both in a rotary direction and in a linear direction.

Other features and advantages of the invention will be apparent from the following description, the accompanying drawings and the appended claims.

DESCRIPTION OF THE PREFERRED EMBODIMENT

Figure 1:
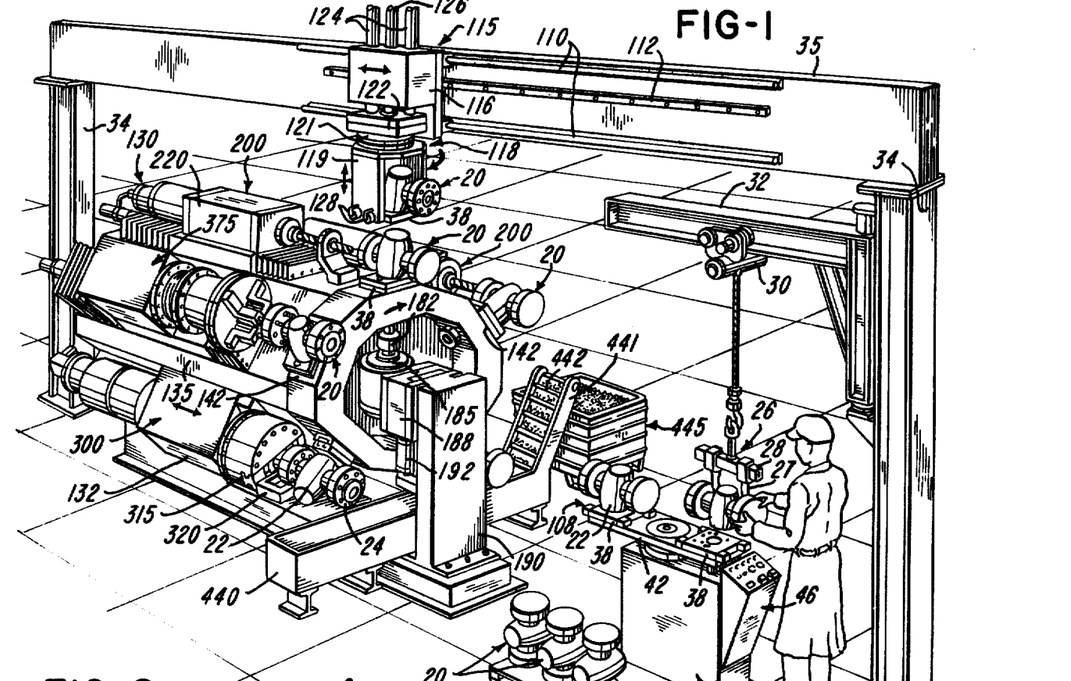
FIG. 1 is a perspective view of a machine tool constructed in accordance with the present invention.

The machine tool system shown in FIG. 1 is capable of automatically machining a supply of workpieces which are illustrated in the form of unfinished forged gate valve bodies 20 each including an annular bonnet portion 22 disposed between opposing end flanges 24. As received, the bonnet portion of each valve body 20 has been previously machined and has a series of eight threaded holes formed within the annular bonnet face. Each of the valve bodies 20 is picked up by a lifting unit 26 which includes a pair of hook shaped support elements 27 adjustably mounted on a tubular bar 28. The lifting unit 26 is supported by a hoist 30 mounted for horizontal movement along a cantilevered beam 32 which is pivotally supported by a vertical column 34. The upper end of the column 34 is rigidly connected by a horizontal cross beam 35 to the upper end of another vertical column 34 to form an inverted U-shaped bridge.

WORKPIECE AND FIXTURE MEMBER ASSEMBLY UNIT

The machine tool system will be described in connection with the handling and machining of one of the valve bodies 20. However, it is to be understood that the machine tool is adapted for successively handling and machining a continuous supply of valve bodies. Each of the valve bodies 20 is lifted by the hoist 30 and positioned by an operator onto the upper face of a rectangular fixture member or plate 38 which carries a series of splined head screws 39 (FIG. 6) arranged according to the threaded holes within the bonnet 22 of the valve body. The fixture plate 32 is mounted on one end portion of an elongated rectangular table 42 of an automatic workpiece and fixture member assembly unit 45 which also supports a control console 46. The table 42 is supported for rotary indexing in 180° steps by the inner race of an anti-friction bearing 48 (FIG. 4) having an outer-race secured to a plate 49 mounted on the upper end portion of a cylindrical support stand or riser 52. The base of the riser 52 is secured to a base plate 54 forming part of a frame 55.

Figure 2:
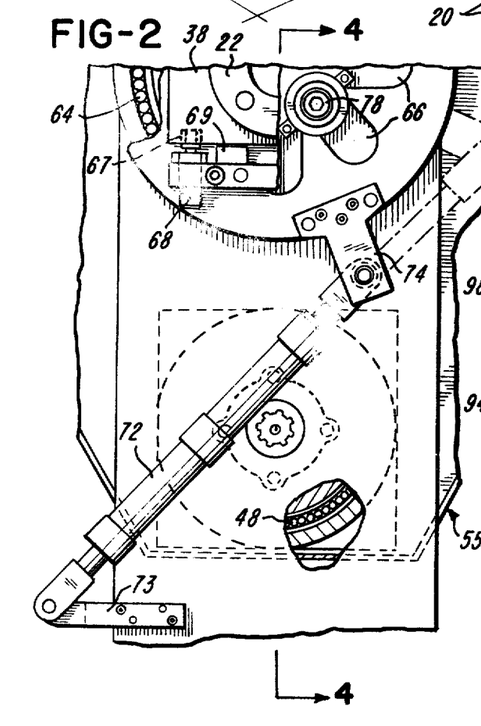
FIG. 2 is a fragmentary plan view of a workpiece and fixture attaching device with portions broken away to show internal construction.
Figure 3:
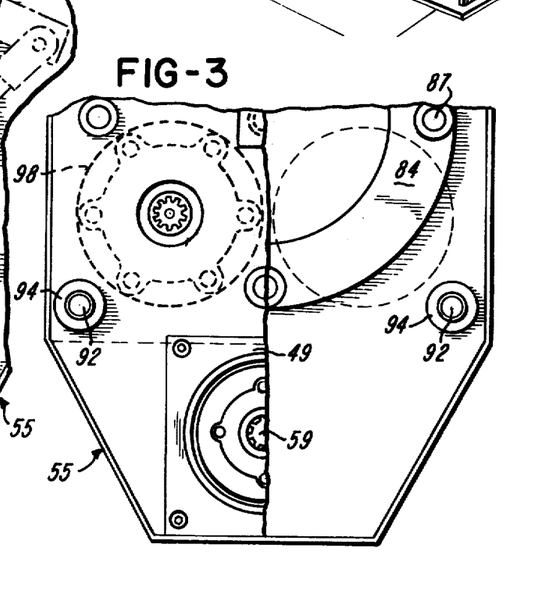
FIG. 3 is a fragmentary section of the workpiece-fixture attaching device taken generally on the line 3—3 of FIG. 4 and with portions broken away.

An oscillating vane type hydraulic motor 58 is supported within the riser 52 and has an upwardly projecting shaft 59 which is connected by a splined coupling to the table 42. The fixture plate 38 is supported by a circular platform 63 (FIGS. 2 and 4) which is rotatably supported by an anti-friction bearing 64 (FIG. 4) secured to the upper surface of the table 42. The platform 63 has a series of peripherally spaced U-shaped slots 66 (FIG. 2) which defines therebetween inwardly projecting fingers for supporting the fixture plate 38. A pair of tubular bushings 67 (FIG. 4) are inserted into each of the four edge surfaces of the fixture plate 38, and the two sets of bushings 67 on opposite edges of the fixture plate 38 are adapted to receive corresponding shot pins projecting from a set of hydraulic cylinders 68 (FIG. 2) secured to the upper surface of the platform 63.

A set of stops 69 (FIG. 2) are also carried by the platform 63 and cooperate with the shot pin cylinders 68 to position the fixture plate 38 precisely relative to the platform 63. A three-position cylinder 72 (FIG. 2) extends from a bracket 73 secured to the table 42 to a bracket 74 secured to the platform 63. Actuation of the cylinder 72 is effective to rotate or index the platform 63 and the supported fixture plate 38 between three positions for presenting the hold down screws 39 carried by the fixture plate 38 to a set of four screw driving units 75 which form part of the workpiece-fixture plate assembly unit 45 and are located under the indexing table 42.

Figures 4, 5, 6:
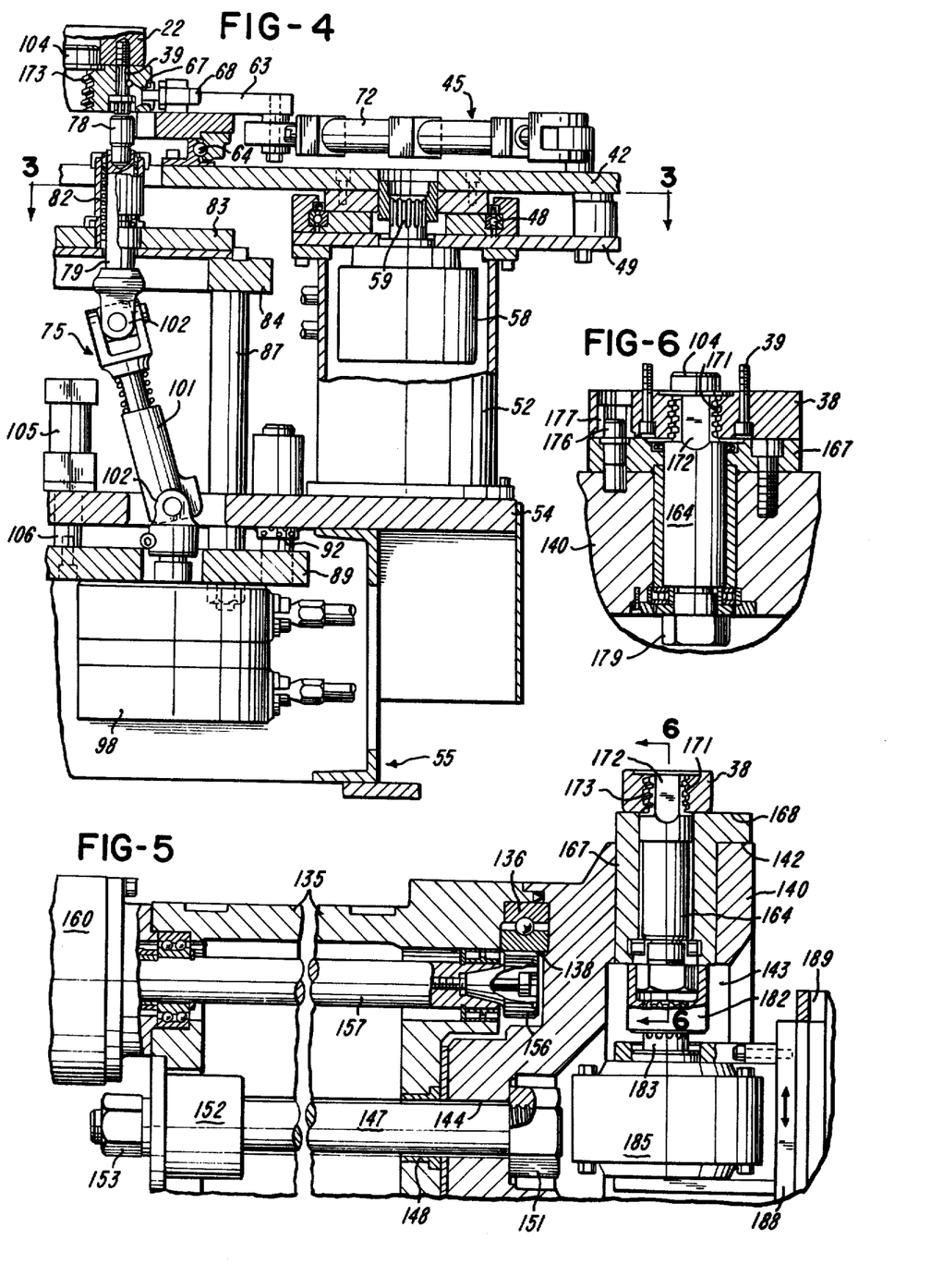
FIG. 4 is a vertical fragmentary section of the attaching device taken generally on the line 4—4 of FIG. 2.
FIG. 5 is a fragmentary vertical section of the turret support and indexing structure, and with a center portion broken away.
FIG. 6 is a fragmentary section taken generally on the line 6—6 of FIG. 5.

Referring to FIG. 4, each of the screw driving units 75 includes an internally splined socket 78 which is adapted to engage the splined head of an aligned hold-down screw 39 within the fixture plate 38. The socket 78 is supported by a shaft 79 which, in turn, is supported for both rotary and axial movement by a preloaded antifriction bearing 82 mounted on a plate 83. The plate 83 is secured to a ring 86 which is supported by a set of posts 87 projecting upwardly from a plate 89. The plate 89 is supported for vertical movement below the frame plate 54 by a set of guide rods 92 extending through preloaded antifriction sleeve bearings 94 secured to the frame plate 54.

Each of the socket driving shafts 79 is driven by a corresponding reversible hydraulic motor 98 which is secured to the plate 89. The upwardly projecting shaft of the motor 98 is connected to a corresponding shaft 79 by a spring biased splined coupling 101 and a pair of universal joints 102. The assembly of the motors 98, the support plate 89, the ring 86 and the bearing support plate 83 is movable in a vertical direction in response to actuation of a hydraulic cylinder 105 which is mounted on the frame plate 54 and has a piston rod 106 secured to the center of the plate 89.

The workpiece and fixture plate assembly unit 45 operates in the following manner. A fixture plate 38 is positioned on one of the circular platforms 63 of the indexing table 42, and an unfinished valve body 20 is positioned by the hoist 30 so that the face of the bonnet 22 seats on the upper surface of the fixture plate 38. The valve body 20 is precisely aligned with the fixture plate 38 as a result of a center pilot plug 104 (FIG. 4) which projects upwardly from the fixture plate 38 into the center bore formed within the bonnet portion 22 of the valve body. The shot pin cylinders 68 are then actuated to lock the fixture plate 38 to the platform 63 and the set of four hydraulic motors 98 are actuated while the motors 98 are elevated by actuation of the cylinder 105.

When the plate 89 is elevated, the four sets of rotating sockets 78 engage the correspondingly aligned hold-down screws 39 and thread the screws into the tap holes within the bonnet portion 22 of the valve body 20. When the hydraulic motors 98 reach a predetermined torque, for example, 3,000 ft. lbs., the motors 98 stall. After the bonnet portion 22 of the valve body is secured to the fixture plate 38 by one set of four screws 39, the plate 89 is lowered to disengage the sockets 78 from the splined head hold-down screws 39, and the platform 63 is indexed by actuation of the cylinder 72. The steps are then repeated so that another set of four screws 39 are threaded into the bonnet portion 22 to assure that the valve body 20 is rigidly secured to its support fixture plate 38.

The table 42 is indexed 180° to transfer the unfinished valve body 20 and its corresponding support fixture plate 38 to a pick-up station 108, as illustrated in FIG. 1. Another fixture plate 38 is positioned on the opposite end portion of the table 42, and the next unfinished valve body 20 is positioned and secured to the fixture plate according to the procedure described above.

WORKPIECE LOADING AND UNLOADING MECHANISM

A pair of vertically spaced horizontal tracks 110 extend along one side of the overhead beam 35, and a rack 112 extends horizontally between the tracks 110. A loading and unloading device 115 includes a carriage 116 which is mounted on the tracks 110 by preloaded antifriction bearings and is movable along the tracks by actuation of a digitally controlled orbital hydraulic motor (not shown) that drives a pinion engaging the rack 112. The carriage 116 supports a manipulator 118 which includes an inverted U-shaped frame 119. The frame 119 is supported for rotation by a preloaded antifriction bearing 121 mounted on a support plate 122, and is rotated by actuation of an oscillating vane hydraulic motor (not shown) supported by the plate 122.

The manipulator 118 is supported for vertical movement relative to the carriage 115 by a pair of vertical guide rods 124 which extend through preloaded recirculating ball bearings (not shown) supported by the carriage 116. The vertical movement of the manipulator 118 is produced by actuation of another orbital hydraulic motor (not shown) which drives a recirculating ball nut mounted on a vertical ball screw extending upwardly from the support plate 122. The ball screw is enclosed within a casing 126 positioned between the guide rods 124.

A pair of hydraulic shot-pin cylinders 128 (FIG. 1) are mounted on each depending leg or side of the frame 119. After the manipulator 118 is moved to the pick-up station 108 and the frame 119 straddles an unfinished valve body 20 and its corresponding fixture plate 38 mounted on the outwardly projecting end portion of the transfer table 42, the shot pin cylinders 128 are actuated to engage the correspondingly aligned bushings 66 within the fixture plate 38. The cylinders 68 are actuated to retract their shot pins from the corresponding bushings 66 within the fixture plate 38 and thereby release the fixture plate from attachment to the platform 63.

MACHINE TOOL ASSEMBLY

After the unfinished valve body 20 is picked up by the manipulator 118, the valve body 20 and its supporting fixture plate 38 are transferred to an automatically controlled machine tool assembly 130. This assembly includes a base frame 132 which is adapted to be secured to the floor and supports a large hexagonal casting which forms a base housing 135 (FIGS. 1 and 5) having a horizontal axis. A large diameter antifriction bearing 136 has its outer race rigidly secured to the housing 135 and an inner race which includes an internal ring gear 138. A generally circular turret 140 is rigidly secured to the inner race of the bearing 136 for rotation on the horizontal center axis of the housing 135. The turret 140 has a series of peripherally spaced external flats 142 (FIG. 1) and an internal cavity 143 (FIG. 5) which extends to a center bore 144. The turret 140 is adapted to be rigidly clamped to the outer race of the bearing 136 by a draw rod or clamping bar 147 which is supported for axial movement by a sleeve bearing 148 retained by the adjacent wall of the housing 135. One end portion of the bar 147 extends through the bore 144 and receives a large nut 151 (FIG. 5), and the opposite end portion of the bar 147 extends through an annular piston of a hollow bore hydraulic cylinder 152 mounted on the rearward end wall of the housing 135. A nut 153 locks the rearward end portion of the bar 147 to the annular piston of the cylinder 152.

The turret 140 is rotated or indexed in response to rotation of a pinion 156 (FIG. 5) secured to the inner or forward end portion of a shaft 157 rotatably supported by bearings confined within bores formed in the housing 135. The shaft 157 is rotated or indexed by a hydraulic motor 160 which is mounted on the rearward end wall of the housing 135. The turret 140 also includes a series of radially extending hold-down or clamping screws 164, one for each of the flats 142. Each of these screws 164 is rotatably supported by a set of antifriction bearings confined within a sleeve 167 which extends through a corresponding radial bore formed within the turret 140 between the corresponding flat 142 and the inner cavity 143. The upper surface of each sleeve 167 forms a seat 168 which is adapted to receive one of the fixture plates 38 secured to an unfinished valve body 20.

A breach-lock type screw thread 171 is formed on the outer end portion of each screw 164 along with a pair of diametrically opposed flats 172. A correspondingly shaped threaded opening or hole 173 (FIGS. 4 and 6) is formed within the center of each of the fixture plates 38 so that each fixture plate 38 is rigidly clamped to its corresponding seat 168 in response to rotation of the corresponding screw 164 by approximately 60°. Each fixture plate 38 is precisely aligned with the corresponding clamping screw 164 by a set of shot-pins 176 (FIG. 6) which project upwardly from the corresponding sleeve 168 and are received within corresponding bushings 177 inserted into holes formed within each of the fixture plate 138.

A hexagonal head 179 (FIGS. 4 and 6) forms the lower end portion of each of the clamping screws 164 and is adapted to receive a correspondingly shaped socket 182 which is mounted on the upwardly projecting shaft 183 of a hydraulic motor 185 positioned within the cavity 143 of the turret 140. The motor 185 is supported by a carriage 188 which is mounted for vertical movement on guideways 189 extending vertically on a pedestal 190 (FIG. 1) projecting upwardly from one end of the base frame 132. A hydraulic motor 192 (FIG. 1) is mounted on the carriage 188 and drives a ball screw (not shown) for moving the carriage 188 and motor 185 vertically on the guideways 189 to move the socket 182 into and out of engagement with the head 179 of each clamping screw 164.

After an unfinished valve body 20 and its supporting fixture plate 38 are positioned on one of the seats 168 of the turret 140, the hydraulic motor 185 is actuated to rotate the corresponding clamp screw 164 causing the valve body 20 and fixture plate 35 to be rigidly clamped to the turret 140. The motor 185 exerts a substantial torque, for example, of 100,000 inch-lbs. before it stalls. The motor 185 is then deenergized and lowered to disengage the socket 182 with the screw head 179.

DRILLING UNIT

Figures 10, 11, 12, 13:
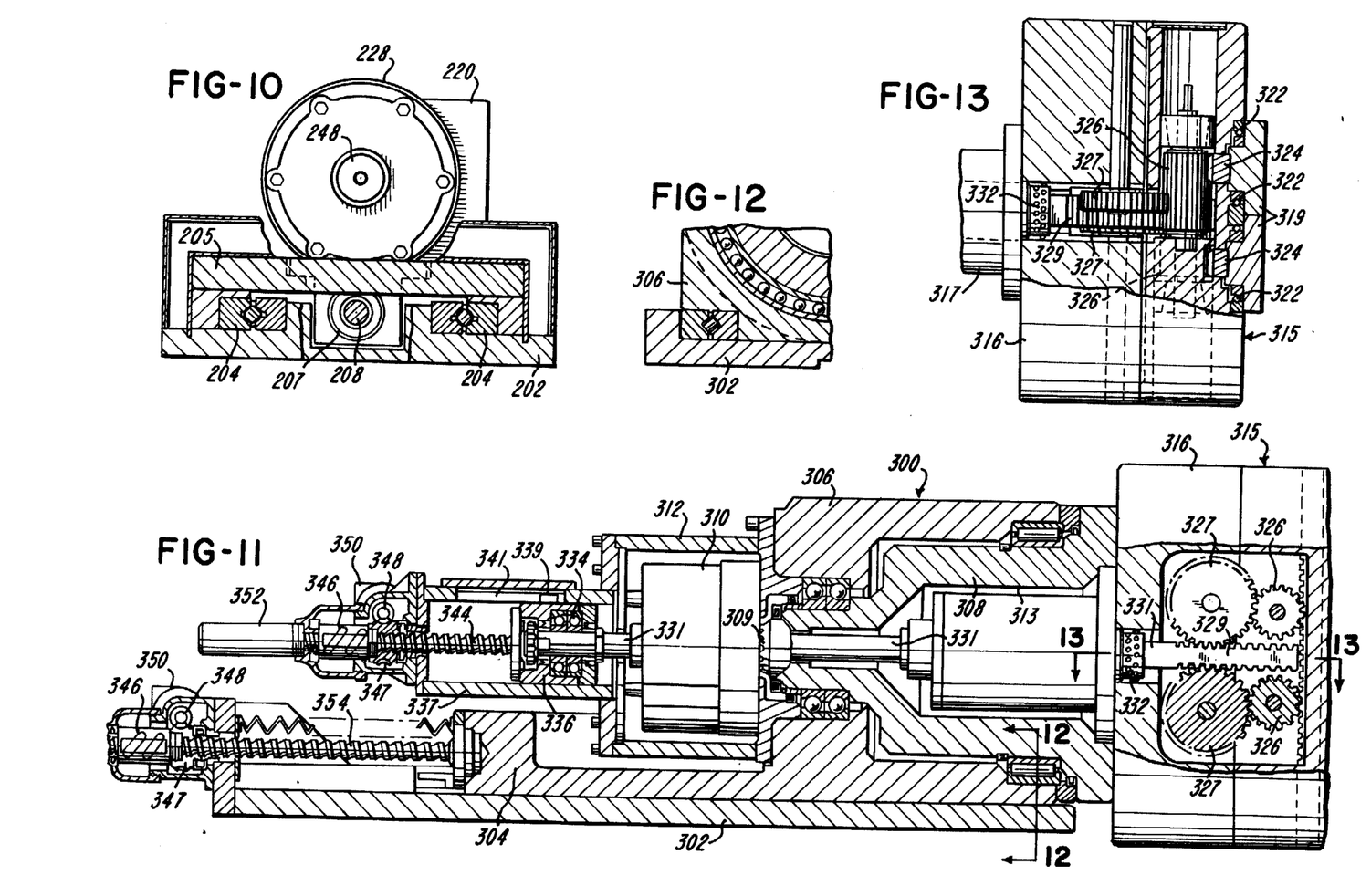
FIG. 10 is a vertical section taken generally on the line 10—10 of FIG. 7 and with a portion broken away.
FIG. 11 is a longitudinal or axial section of a machine tool cross-facing unit incorporated in the machine tool shown in FIG. 1.
FIG. 12 is a fragmentary section taken generally on the line 12—12 of FIG. 11.
FIG. 13 is a fragmentary section taken generally on the line 13—13 of FIG. 11.

After an unfinished valve body 20 is rigidly secured to the turret 140, and the turret 140 is rigidly clamped to the housing 135 by actuation of the hydraulic cylinder 152, the center bore or passage of the valve body is rough bored or drilled by a drilling unit 200 (FIGS. 1 and 7) which is mounted on the top flat 142 of the housing 135 and forms an initial drilling station. The drilling unit 200 (FIG. 7) includes an elongated rectangular base or bed 202 which supports the inner races of a pair of parallel spaced longitudinally extending antifriction linear bearings 204 (FIG. 10). The outer races of the bearings 204 are rigidly secured to a carriage 205.

An antifriction ball screw nut 207 is secured to the rearward end portion of the carriage 205 and receives an elongated ball screw 208 which is rotatably supported by antifriction bearings 209 and 211, the latter of which is confined within a bearing housing 212 secured to the rearward end of the bed 202. A reversible hydraulic orbital motor 214 is mounted on the housing 212 and is connected by a coupling 216 to the ball screw 208 for moving the carriage 205 on the bed 202 at predetermined speeds.

A hollow spindle housing 220 (FIG. 7) is rigidly secured to the carriage 205 and rotatably supports a generally cylindrical spindle 222 by a forward antifriction roller bearing 223 and a rearward antifriction ball bearing 224. The spindle 222 has a splined rearward end portion 226 which extends through an internally splined hollow shaft (not shown) of a hydraulic motor 228 which is rigidly secured to the rearward end of the spindle housing 220. A cylindrical bore 231 is formed within the spindle 222 and receives a collet 232 which has a flange secured to the forward end of the spindle 222. The collet 232 has a tapered socket 234 which is adapted to receive the correspondingly shaped tapered shank of a cutting tool such as the drill 235.

Figure 7:
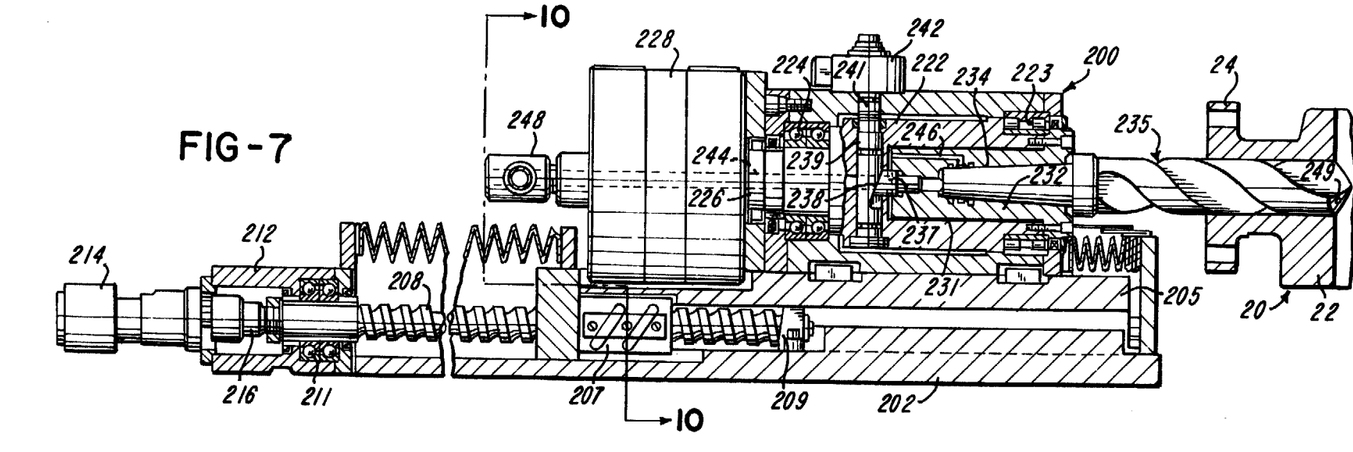
FIG. 7 is a longitudinal or axial section of one of the machine tool drilling units shown in FIG. 1 and illustrating the drilling of a high pressure valve body.

An ejector pin 237 is supported for axial movement within the rearward end portion of the collet 232 and has a tapered rearward end surface which engages a correspondingly tapered cam surface 238 formed on a cross-pin 239 confined within a radially extending bore formed within the spindle 222. An outer end portion of the cross-pin 239 is adapted to be engaged by a piston 241 projecting from a hydraulic ejector cylinder 242 mounted on the top of the spindle housing 220. When the cross-pin 239 is aligned with the piston 241, and the cylinder 242 is actuated, the ejector pin 237 is cammed forwardly to press or eject the tapered shank of the drill 235 from the tapered socket 234 of the collet 232. This provides for conveniently removing and replacing the cutting tool or drill 235.

An axially extending passage 244 (FIG. 7) extends through the center of the spindle 222 and through the rearward end portion 226 of the spindle. The forward end of the passage 244 is connected by a passage 246 within the collet 232 to the tapered socket 234 within the collet. A rotary union 248 is connected to the rearward end portion of the spindle 222 and is adapted to receive a pressurized supply of liquid coolant which is supplied through the passages 244 and 246 to a set of holes 249 extending generally axially within the drill 235. Thus the coolant flows directly through the center of the hydraulic drive motor 228 and the close coupled spindle 222 to the cutting tip of the drill 235. A series of O-ring seals are mounted on the cross-pin 239 and on the collet 232 for directing the coolant from the passage 244 to the passage 246 and into the holes within the drill 235.

As illustrated in FIG. 7, one end portion of the fluid passage within the valve body 20 is drilled by actuating the hydraulic motor 228 and by simultaneously actuating the hydraulic motor 214 so that the close-coupled spindle 222 and hydraulic motor 228 are fed forwardly at a predetermined rate to feed the drill 235 into the valve body, and thereby produce a somewhat roughly finished passage within one end portion of the valve body 20. The drill 235 is retracted from the valve body at a rate faster than it was fed into the body by driving the motor 214 in a reverse direction at a higher speed. It is to be understood that each of the hydraulic motors herein disclosed are supplied with a fluid from a variable displacement hydraulic pump which provides for selecting the speed of each motor during each phase of a machining operation.

After one end portion of the valve body 20 is drilled at the first drilling station, the turret 140 is released from its rigid clamped engagement with the housing 135 by actuation of the cylinder 152, and then the turret 140 is indexed 60° clockwise (FIG. 1) to present the roughly drilled valve body 20 to a second drilling station where another one of the drilling units 200 is located and is effective to produce a finish surface on the fluid passage within the valve body 20.

TAPPING UNIT

After the finish drilling operation at the second machining station, the turret 140 is again released from the housing 135 and is indexed another 60° to present the valve body 20 to a third machining station where a tapping unit 260 (FIG. 8) is mounted on the housing 135. The tapping unit 260 is used for forming internal threads within each end portion of the drilled fluid passage within a valve body 20' which does not have end flanges for connecting the valve body to adjacent pipes. A substantial portion of the tapping unit 260 is constructed similar to the drilling unit 200, and accordingly, the same reference numbers have been used for common components.

Figure 8:
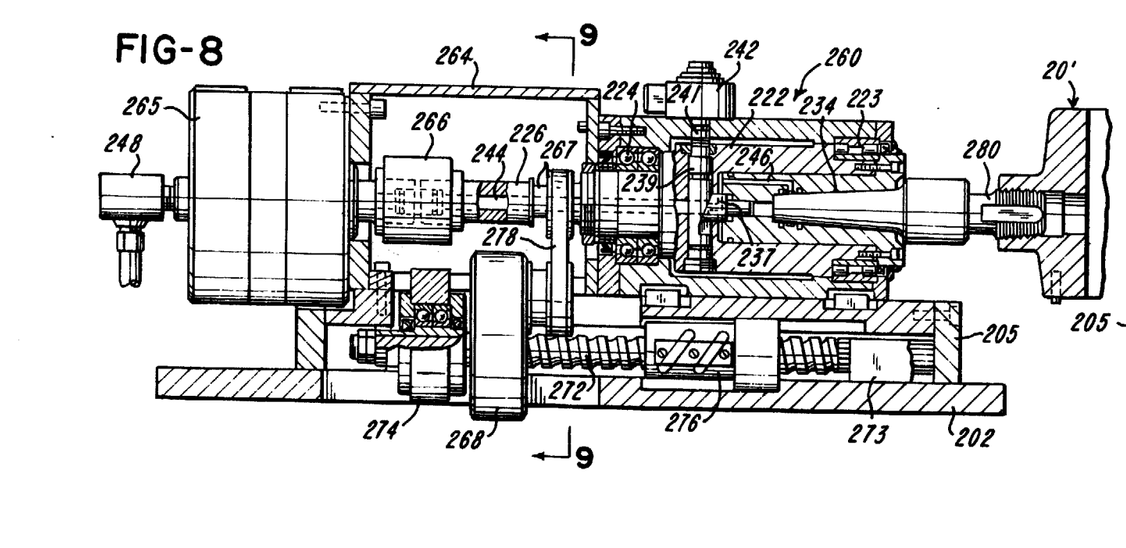
FIG. 8 is a longitudinal or axial section similar to FIG. 7 and showing the internal construction of a machine tool tapping unit incorporated in the machine tool shown in FIG. 1.
Figure 9:
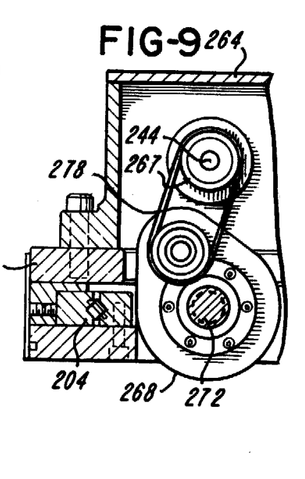
FIG. 9 is a fragmentary section taken generally on the line 9—9 of FIG. 8.

In addition, the tapping unit 260 includes a belt and gear case housing 264 which is positioned between the spindle housing 220 and a hydraulic motor 265 and supports the motor 265 in axial alignment with the spindle 222. The rearward splined end portion 226 of the spindle 222 is connected by a coupling 266 to the shaft of the motor 265. A pair of gear belt pulleys 267 of different diameters are mounted on the rearward end portion 226 of the spindle 222 and on the input shaft of a gear type speed reducer 268. The driven gear of the speed reducers 268 is mounted on an elongated ball screw 272 which has its forward and rearward end portions rotatably supported by corresponding bearings 273 and 274. A recirculating ball nut 276 is mounted on the screw 272 and is rigidly secured to the carriage 205 so that rotation of the screw 272 is effective to move the carriage 205 axially at a rate which is in timed relation with the rotational speed of the spindle 222.

The speed reducer 268 is supported for rotation on the axis of the screw 272 for installing a gear belt 278 on one set of pulleys 267 and to provide for selecting a proper tension within the belt. As shown in FIG. 8, the collet 232 receives the tapered shank of a tap 280 which is provided with an axially extending passage (not shown) through which coolant flows from the rotary union 248 through the motor 228, the coupling 266, the spindle 222 and the collet 232 to the thread cutting elements on the forward end of the tap 280.

CROSS-FACING UNIT

Following the tapping station around the main support housing 135, is a rough turning or cross-facing unit 300 (FIGS. 11–13) rigidly secured to a corresponding flat surface of the housing 135. The cross-facing unit 300 operates to machine the inner and outer faces of each flange 24 of the valve body 20 and includes a bed 302 which supports a carriage 304 for linear movement by a set of antifriction bearings constructed the same as the bearings 204 referred to above in connection with FIG. 10. The carriage 304 includes an integral spindle housing 306 which rotatably supports a hollow spindle 308 by a set of forward and rearward antifriction bearings. The rearward end portion 309 of the spindle 308 is splined and extends through the internally splined hollow shaft of a hydraulic motor 310 mounted on a frame 312 secured directly to the rearward end surface of the spindle housing 306.

The spindle 308 includes a cylindrical bore 313 which supports a cross-facing head 315 having a hub portion 317 which projects into the bore 313. The head 315 includes a body 216 which supports a pair of parallel tool support members 319 (FIG. 13). Each of the members 319 supports a U-shaped tool block 320 (FIG. 1) adapted to receive or straddle a flange 24 on a valve body 20. Each of the blocks 320 carries a set of cross-facing or turning tool elements (not shown) which are adapted to machine both the inner and outer faces of the flange 24 as the tool blocks 320 move radially on the head 315 with the tool support members 319.

The tool support members 319 are supported for generally radial movement on the body 316 of the head 315 by a pair of preloaded antifriction linear roller bearings 322 (FIG. 13) constructed the same as the bearings 204 shown in FIG. 10. A rack 324 is secured to each of the tool support members 319 and is engaged by corresponding pinion 326 (FIG. 11) which also engages a corresponding transfer gear 327 mounted for rotation within the body 316. An axially extending double-faced rack 329 engages both of the transfer gears 327, and axial movement of the rack 329 is effective to produce simultaneous radial movement of the tool support members 319 in opposite directions.

The rack 329 is connected to an actuating rod 331 which is supported for axial movement by a preloaded antifriction sleeve bearing 332 confined within a bore extending through the center of the hub portion 317 of the cross facing head 315. The rod 331 extends through the rearward end portion 309 of the spindle 308 and projects from the rearward end of the hydraulic motor 310. The rearward end portion of the rod 331 is supported by antifriction bearings 334 which are confined within a housing 336 slidably supported within a cylinder 337 projecting rearwardly from the motor support frame 312. A stub pin 339 projects radially outward from the housing 336 into an axially extending slot 341 formed within the cylinder 337 to prevent rotation of the housing 336 with the actuating rod 331 which rotates with the spindle 308.

To produce axial movement of the rod 331 and the housing 336, the rearward end portion of the housing 336 is connected to a ball screw 344 which projects rearwardly through a rotatably supported recirculating ball nut 346. A worm gear 347 is secured to the nut 346 and is driven by a worm 348 mounted on the shaft of a reversible orbital-type hydraulic motor 350. A cylindrical casing 352 encloses the rearwardly projecting end portion of the ball screw 44. The carriage 304 is movable on the bed 302 by another ball screw 354 which extends through another nut driving unit including a nut 347 driven by another orbital hydraulic motor 350. Another cross-facing unit 300 is located 60° clockwise (FIG. 1) from the first unit 300 and is effective to finish turn or face the end flange after the turret is again indexed.

MULTIPLE DRILLING UNIT

Figures 14, 15, 16:
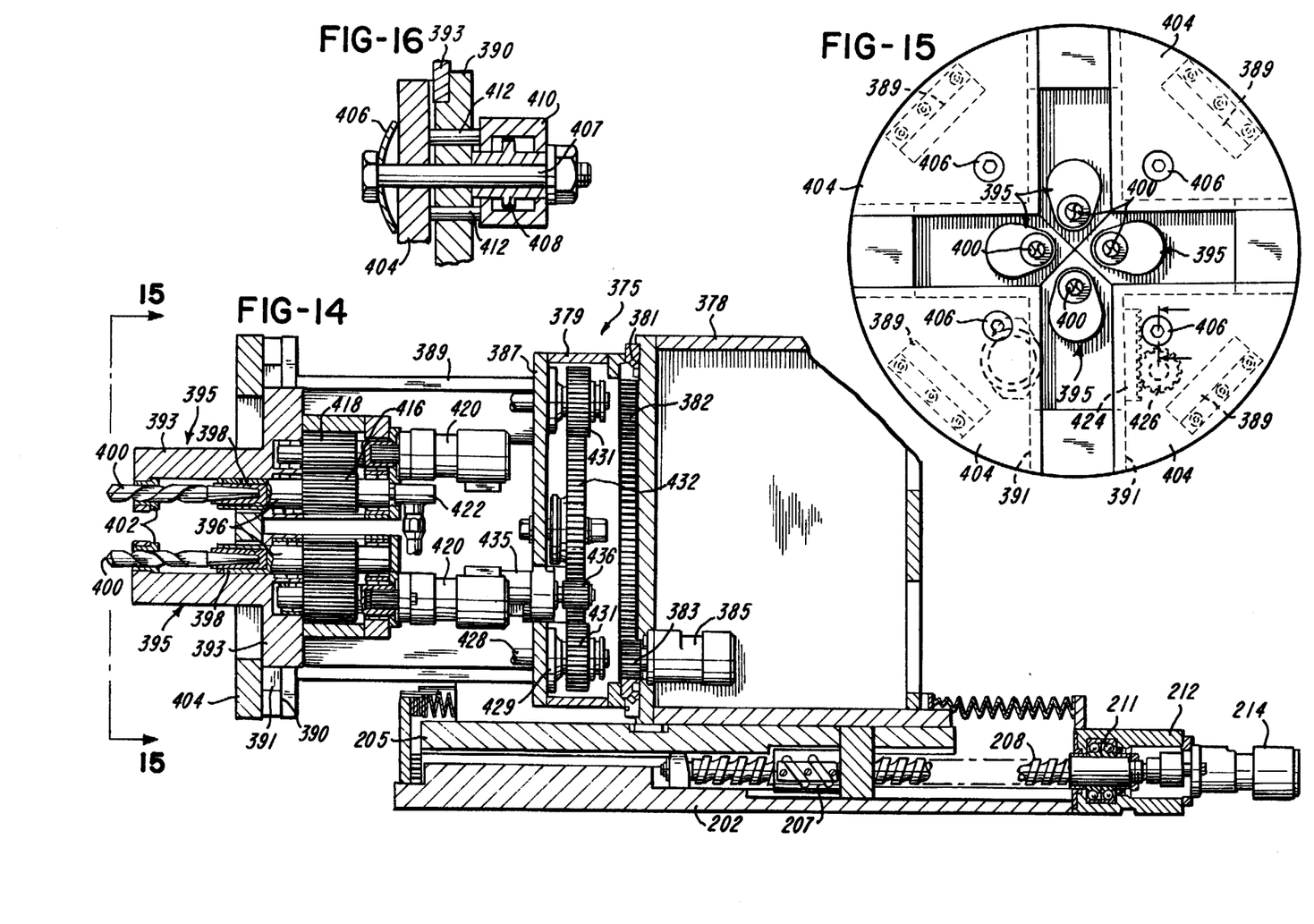
FIG. 14 is a longitudinal or axial section of a machine tool multiple drilling unit incorporated in the machine tool shown in FIG. 1.
FIG. 15 is an elevational view of the multiple drilling unit taken generally on the line 15—15 of FIG. 14.
FIG. 16 is a fragmentary section taken generally on the line 16—16 of FIG. 15.

Referring to FIGS. 1 and 14, a multiple head drilling unit 375 is mounted on the base housing 135 at a station located 60° clockwise (FIG. 1) from the second cross-facing unit 300 and 60° counterclockwise from the single drilling unit 200. The drilling unit 375 also includes a carriage 205 which is supported by a bed 202 and moved linearly along the bed in the same manner as described above for the single drilling unit 200 shown in FIG. 7. Thus the same reference numbers are used for the common components.

A box-like housing or frame 378 (FIG. 14) is secured to the carriage 205 and rotatably supports a cylindrical housing 379 by an annular preloaded antifriction roller bearing 381. The inner race of the bearing 381 includes an integral internal ring gear 382 which is engaged by a pinion 383 mounted on the shaft of an orbital hydraulic motor 385 supported by the frame 378. The housing 379 includes a circular front plate 387 which supports a series of four forwardly projecting pillars 389. An annular head plate 390 is rigidly secured to the forward ends of the pillars 389 and is provided with a set of crossing guideways 391 (FIG. 15) which slidably support the housings 393 of four separate drilling heads 395.

Each of the housings 393 rotatably supports a hollow spindle 396 which receives a collet 398 adapted to receive the tapered shank of a corresponding drill 400. A bushing 402 is also supported by each of the housings 393 and forms a guide for the corresponding drill 400. A set of four sector-shaped clamping plates 404 are arranged between the drilling heads 395 and are normally pressed against the housing 393 by a set of Bellville washers 406 (FIG. 16) and bolts 407. Each of the bolts 407 extends through a hollow piston 408 (FIG. 16) confined within a hydraulic cylinder 410 mounted on the head plate 390. A set of pins 412 extends through the head plate 390 for each of the cylinders 410 and are adapted to press on the corresponding clamping plate 404 and thereby release the corresponding drilling head 395 for sliding movement within the guideways 391 when the cylinder 410 is actuated.

Each of the hollow drill support spindles 396 includes an integral gear 416 which is driven by a similar gear 418 connected to the splined output shaft of an orbital-type hydraulic motor 420 mounted on the corresponding housing 393. A rotary union 422 is coupled to the rearward end of each of the spindles 396 for supplying coolant through the spindle to the collet 398 and the axially extending holes or passages within corresponding drill 400.

A rack 424 (FIG. 15) is secured to one side of each of the housing 393 and engages a pinion 426 which is mounted on the forward end portion of a corresponding axially extending shaft 428 (FIG. 14). The rearward end portion of each shaft 428 is rotatably supported by a bearing 429 mounted on the front plate 387 of the housing 379, and a pinion 431 is mounted on each of the shafts 428 within the housing 379. Each of the pinions 431 engages a sun gear 432 rotatably supported by a bearing 433 secured to the center of the plate 387. An orbital hydraulic motor 435 is also supported by the plate 387 and drives a pinion 436 which also engages the sun gear 432. When the motor 435 is energized, and the sun gear 432 is rotated to rotate the set of shafts 428, each of the drill heads 395 moves in a radial direction relative to the center line of the head plate 390 thereby changing the diameter of the circular arrangement of the drills 400. When the drills 400 are positioned at the desired diameter, the hydraulic cylinders 410 are released so that the heads 395 are rigidly clamped to the head plate 390 by the forces exerted by the concave Bellville washers 406.

After one of the end flanges 24 has been finished turned by the second cross-facing unit 300, and the turret 140 is indexed to present the valve body 20 to the multiple head drilling unit 375, the turret 140 is clamped to the base housing 135 by the cylinder 152. The carriage 205 of the drilling unit 375 is advanced forwardly by actuating of the corresponding orbital hydraulic motor 214, and the set of four rotating drills 400 are fed through the opposing flange 24 of the valve body 20 as illustrated in FIG. 1. The drills 400 are then retracted, and the motor 385 is actuated to index or rotate the housing 379 and the drilling heads 395 through an angle of 45°. The drills 400 are then again fed through the flange to form another set of four bolt holes so that the flange has a total of eight bolt holes.

After the flange drilling operation, the turret 140 is indexed to present the partially finished valve body 20 to the original or first machining station at the top of the turret 140. The fixture plate 38 supporting the valve body is automatically released from the turret 140 by rotation of the lock screw 171 with the motor 185. However, before the fixture plate 138 is released, the manipulator 118 is lowered into straddling relation with the fixture plate and engages the fixture plate by actuation of the opposing pairs of shot-pin cylinders 128. After the fixture plate is released from the turret 140, the manipulator 118 lifts the partially finished valve body upwardly a short distance, rotates the valve body by 180° and then reseats the valve body and fixture plate back on the turret 140. The fixture plate 38 is reclamped to the turret 140 by rotation of the screw 164. The valve body 20 is again successively presented to each of the machining units spaced around the base housing 135 so that the opposite end or flange portion 24 of the valve body 20 is automatically machined in the same manner as described above for the first flange portion.

As shown in FIG. 1, the metal chips which are produced during the machining of each valve body 20, are received within an elongated bin 440 and are transported up a ramp 441 by an endless conveyor 442 to a suitable receiving container 445. The bin 440 and conveyor 442 extend horizontally under the turret 140 between the pedestal 190 and the base frame 132.

SUMMARY

From the drawings and the above description, it is apparent that the complete machine tool system and each of the machine tool units or components constructed in accordance with the present invention, provide many desirable features and advantages. For example, the system provides for automatically and efficiently machining a series of workpieces which require various machining operations. As mentioned above each of the components of the system is adapted to be numerically controlled, for example, by a computer or a punched tape control unit, and the entire machining operation is under the command of a single operator located at the remote control panel 46. As also mentioned above, the machine tool system and each of the machine tool components or units are described in connection with the machining of a high pressure heavy duty gate valve. It is to be understood that the machine tool system and each of the machine tool units may be used for precisely machining any form of workpiece which may require a drilling, tapping, boring, turning, facing or other similar machining operation.

Another important advantage is provided by the workpiece and fixture plate assembly unit 45. This unit provides for quickly and rigidly securing each workpiece or valve body 20 to a corresponding standard size fixture plate 38 so that each unfinished workpiece can be automatically transported or loaded from the table 42 to a seat on the turret 140 and precisely positioned for rapid and rigid clamping to the turret by the corresponding breech-lock screw 171. It is apparent that different fixture plates 38 may be used with different size workpieces and that the fixture plates provide for quickly adapting the automatic machine tool system for machining various workpieces. The manipulator 118 also cooperates with each fixture plate 38 to transport or unload a finished workpiece from the turret 140 back to the table 142 of the assembly unit 45 where the fixture plate is automatically released from the finished workpiece, and the fixture plate is ready to receive another unfinished workpiece.

In addition to the rigid clamping of each workpiece to the turret 140 by means of the corresponding fixture plate 38 and hold down or clamping screw 164, the periphery of the turret 140 is rigidly clamped to the base housing 135 by the center bar 147 and the hydraulic cylinder 152. This assures that each workpiece is rigidly supported and cannot vibrate or shift during each machining operation and enables the workpiece to be machined to precise tolerances. In addition, the cylinder 152 provides for releasing the turret 140 for indexing by operation of the hydraulic motor 160 to present each workpiece to each of the machine tool units.

Other important features are provided by the drilling unit 200 and the tapping unit 260. That is, the construction and support of the spindle 222 and the extension of the rearward end portion 226 of the spindle through the internally splined hollow shaft of the motor 228, provides for a direct cross-coupled relation of the drive motor 228 and spindle 222 and assures that the drill 235 or tap 280 or any other cutting tool is positively supported and does not vibrate or chatter during the cutting operation. Furthermore, the variable speed hydraulic motor 228 provides substantial torque and for conveniently supplying a coolant fluid through the motor and directly into the center of the spindle and collet to the holes within the cutting tool. In addition, the ejector pin 237 and the cross pin 239 cooperate with the cylinder 242 to provide for convenient removal of the cutting tool from the supporting collet 232. It is also apparent that the splined portion 226 of the spindle 222 may be extended through the hollow splined shafts of a plurality of motors 228 arranged in stacked axially aligned relation in order to increase the horsepower for driving the cutting tool.

The turning or cross-facing unit 300 also provides desirable features. The hollow spindle hydraulic motor 310 provides for a close-coupled in-line relation between the spindle 308, the head 315 and the hydraulic motor. In addition, the arrangement of the transfer gears 327 and the pinions 326 within the cross facing head 315, provide for substantial radial movement of the tool supporting members 319 and the corresponding tool elements which are mounted on the support members without requiring the rack 329 to project forwardly of the head 315. Another important feature is provided by the support of either the carriage 205 or 304 by the corresponding support bed 202 or 302. That is, the preloaded antifriction linear bearings 204 provide for smooth and precise linear movement of the carriage in an axial direction relative to the turret 140 and thereby aid in assuring precise machining of each workpiece.

In reference to the multiple head drilling unit 375 shown in FIGS. 14-16, this unit provides remotely controllable means for adjusting the radial positions of the drilling heads, for example, to change the diameter of the circular arrangement of the holes within the flanges 24 of the valve body 20. In addition, the unit provides for supplying a fluid coolant directly through the spindles to the corresponding drills 400 and also provides for rotating or indexing the drill heads as a unit. Furthermore, each of the drill head 395 is rigidly clamped to the head plate 390 by the spring washers 406 and the corresponding bolts 407 to assure that each of the drill heads is rigidly supported after it is precisely positioned.

While the forms of apparatus herein described constitute preferred embodiments of the invention, it is to be understood that the invention is not limited to these precise forms of apparatus, and that changes may be made therein without departing from the scope and spirit of the invention.

I claim:

1. A machine tool adapted for successively machining a supply of workpieces, comprising a base frame, a turret having means forming a plurality of peripherally spaced seats on said turret, said turret having an annular portion defining a cavity, means mounted on said frame and supporting said turret for rotary indexing, a fixture member for each workpiece, means for releasably and rigidly securing each workpiece to its corresponding said fixture member, said turret including a movable clamping member for each of said seats, each said clamping member being movable between a released position and a locked position for rigidly and releasably securing the corresponding said fixture member and workpiece to said turret during indexing of said turret, a power operated actuator positioned within said cavity defined by said annular portion of said turret, means independent of said turret and supporting said actuator for movement relative to said turret, said actuator having means for releasably engaging each said clamping member and for moving each said clamping member between said released and locked positions, a series of machining units disposed around said turret and each unit being adapted to perform a predetermined machining operation on each workpiece, and means for indexing said turret to present each said fixture member and the corresponding workpiece to each of said machining units.

2. A machine tool as defined in claim 1 wherein said turret supporting means comprises an antifriction bearing including a race secured to said turret and supporting a ring gear, said means for indexing said turret include a pinion engaging said gear, and motor means connected to rotate said pinion.

3. A machine tool as defined in claim 1 wherein said clamping members comprise a corresponding plurality of radially extending clamping screws each supported for rotation by said turret, and said power operated actuator is effective to rotate each said clamping screw to draw the corresponding said fixture member firmly against the corresponding said seat on said turret.

4. A machine tool as defined in claim 1 including a manipulator having means for engaging and supporting each fixture member, means supporting said manipulator for vertical and horizontal travel between a first station for receiving each workpiece and a second station for positioning said fixture member on one of said seats on said turret with the workpiece projecting upwardly from said turret.

5. A machine tool as defined in claim 4 wherein said manipulator includes means for rotating each fixture member and workpiece on a predetermined axis to orient the workpiece relative to the corresponding said seat on said turret.

6. A machine tool as defined in claim 4 wherein said means for supporting each fixture member include a plurality of movable pins, and actuating means for moving said pins.

7. A machine tool as defined in claim 6 wherein each said fixture member comprises a generally rectangular fixture plate, and means defining holes within the edges of said fixture plate for receiving said pins.

8. A machine tool as defined in claim 1 wherein said means for securing each workpiece to its corresponding fixture member comprise a plurality of threaded fasteners carried by said fixture member, and including power-operated drive means for rotating each fastener to secure each workpiece to the corresponding said fixture member.

9. A machine tool as defined in claim 8 wherein said means for driving each said fastener, include at least one driving tool supported for movement into engagement with one of said fasteners, and a motor positioned below said table and connected to rotate said driving tool.

10. A machine tool as defined in claim 9 including means for moving said driving tool and said motor in a generally vertical direction to provide for engagement of said driving tool and one of said fasteners.

11. A machine tool as defined in claim 1 including a transfer table having means for receiving a plurality of said fixture members, means supporting said table for indexing on a generally vertical axis to present each said fixture member at a receiving station and at a transfer station, and power-operated means for transferring each work-piece and corresponding said fixture member from said transfer station to said turret.

12. A machine tool as defined in claim 11 including means for rotatably indexing each fixture member and corresponding workpiece relative to said transfer table for presenting each of said fasteners to said fastener drive means.

13. A machine tool as defined in claim 1 wherein one of said machining units comprises a housing having a bore, a hollow spindle rotatably supported within said bore by a set of axially spaced bearings, a drive motor secured to said housing in axially aligned relation and having a hollow shaft connected to said spindle for rotating said spindle, a cross-facing head rigidly secured to said spindle and including at least one tool support member supported for generally radial movement, a rack secured to said tool support member for movement therewith, a pinion engaging said rack, and actuating means including an elongated member extending through said motor shaft and said spindle for rotating said pinion to move said tool support member radially while said head is rotating.

14. A machine tool as defined in claim 13 wherein said drive motor comprises a hydraulic motor having said hollow shaft, and said spindle includes spline means extending into said shaft to effect a close-coupled relation between said motor and said spindle.

15. A machine tool as defined in claim 13 wherein said means for rotating said pinion to move said tool support member comprises a transfer gear positioned inwardly of said pinion and engaging said pinion, a rack member supported for axial movement within the center of said head and engaging said transfer gear, and said actuating means is effective to move said rack member axially within said head.

16. A machine tool as defined in claim 1 wherein one of said machining units comprises a housing, a plurality of parallel spaced spindles each adapted to receive a cutting tool, means mounted on said housing and supporting each of said spindles for rotation and for lateral movement, a hydraulic motor for each said spindle and supported for lateral movement with the corresponding spindle, and power-operated means for simultaneously moving all of said spindles and said motors laterally to facilitate changing the spacing between said cutting tools.

17. A machine tool as defined in claim 16 wherein each said hydraulic motor has a shaft extending parallel to said spindle in laterally offset relation, gear means connecting said shaft of each motor to the corresponding said spindle, means defining an axially extending passage within each of said spindles, and means for supplying a fluid coolant to the inner end of said passages for supplying coolant to the corresponding cutting tool.

18. A machine tool as defined in claim 16 including means for rotatably indexing said spindles and said drive means as a unit on an axis extending parallel to the axis of said spindles.

19. A machine tool as defined in claim 16 including means for supporting and moving said spindles and said motors axially as a unit.

20. A machine tool adapted for successively machining a supply of workpieces, comprising a base frame, a turret having means forming a plurality of peripherally spaced seats on said turret, means mounted on said frame and supporting said turret for rotary indexing, a fixture member for each workpiece, means for releasably and rigidly securing each workpiece to its corresponding said fixture member, said turret including a movable clamping member for each of said seats, each said clamping member being movable between a released position and a locked position for rigidly and releasably securing the corresponding said fixture member and workpiece to said turret during indexing of said turret, a power operated actuator supported independently of said turret to provide for indexing of said turret relative to said actuator, said actuator having means for releasably engaging each said clamping member and for moving said member between said released and locked positions, a series of machining units disposed around said turret and each unit being adapted to perform a predetermined machining operation on each workpiece, one of said machining units comprises a housing having a bore, a spindle rotatably supported within said bore by a set of axially spaced bearings, means defining a socket opening within said spindle between said bearings and adapted to receive a shank of a cutting tool, a hydraulic motor secured to said housing and having a tubular shaft aligned axially with said spindle and connected to said spindle for driving said spindle, means defining a passage extending axially through said spindle and said motor shaft for supplying a fluid coolant to said tool, and means for indexing said turret to present each said fixture member and the corresponding workpiece to each of said machining units.

21. A machine tool as defined in claim 20 wherein said shaft has an internal spline, and said spindle includes an integral spline portion extending into said shaft.

22. A machine tool as defined in claim 21 wherein said spline portion of said spindle extends through said motor shaft, and rotary union means mounted on said spindle portion for supplying fluid coolant through said passage.

23. A machine tool as defined in claim 20 including a set of preloaded antifriction linear bearings supporting the assembly of said housing and said motor for linear movement, and means for moving said assembly on said bearings.

24. A machine tool as defined in claim 23 wherein said means for moving said assembly, comprise a ball screw extending parallel to said bearings, an antifriction ball nut mounted on said screw, and means for rotating said screw.

25. A machine tool as defined in claim 24 wherein said means for rotating said screw, including a transmission positioned between said motor and said housing, and said transmission includes means for driving said screw from said shaft of said hydraulic motor.

26. A machine tool adapted for successively machining a supply of workpieces, comprising a base frame, a turret having means forming a plurality of peripherally spaced seats on said turret, means mounted on said frame and supporting said turret for rotary indexing, said turret including a clamping screw for each of said seats and rotatable between a released position and a locked position for rigidly and releasably clamping each workpiece to a corresponding said seat on said turret, a power operated rotary actuator supported independently of said turret to provide for indexing of said turret relative to said actuator, said actuator having means for releasably engaging each said screw and for rotating said screw between said released and locked positions, a series of machining units disposed around said turret and each unit being adapted to perform a predetermined machining operation on each workpiece, and means for indexing said turret to present each workpiece to each of said machining units.

27. A machine tool as defined in claim 26 wherein each of said clamping screws comprises a breech-lock screw positioned with its axis generally radially relative to the axis of said turret, and said means for rotating each of said clamping screws comprise a motor.

28. A machine tool adapted for successively machining a supply of workpieces, comprising a base frame, a turret having means defining an inner cavity, a plurality of peripherally spaced seats on said turret and each said seat being adapted to receive a workpiece, means mounted on said frame and supporting said turret for rotary indexing on a horizontal axis, means for rigidly securing each workpiece to a corresponding said seat on said turret and including a fixture member for each workpiece, means for securing each fixture member to the corresponding workpiece, a generally radially extending clamping screw within said turret for each said seat on said turret, motor driven means disposed within said cavity and effective to rotate each screw for clamping each fixture member to the corresponding said seat on said turret, a series of machining units disposed around said turret and each unit including a motor driven spindle supported for rotation on an axis extending parallel to the rotational axis of said turret, and means for indexing said turret to present each workpiece to each of said machining units.

* * * * *